No. 636,743. Patented Nov. 14, 1899.
G. C. AVERY.
CULTIVATOR AND HANDLE THEREFOR.
(Application filed Sept. 16, 1899.)
(No Model.) 2 Sheets—Sheet 1.
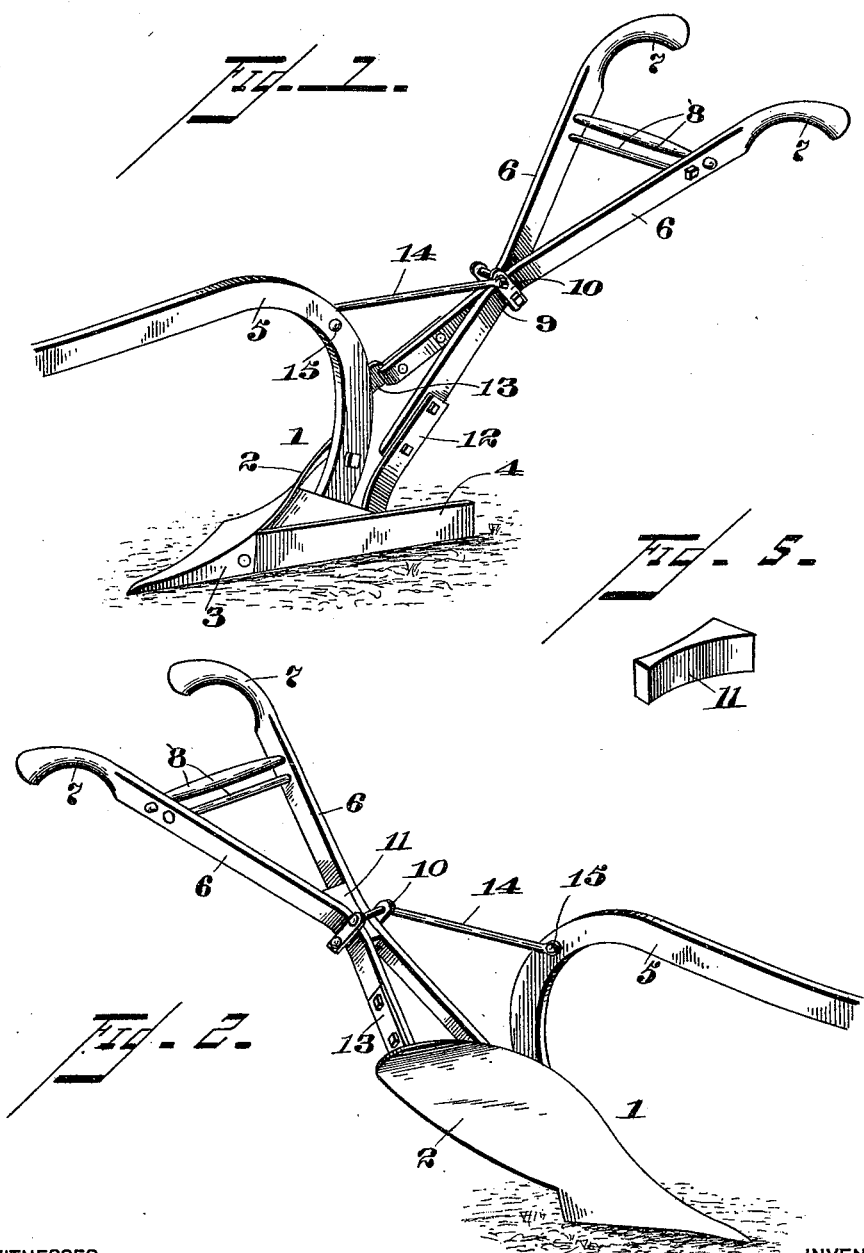
WITNESSES
INVENTOR

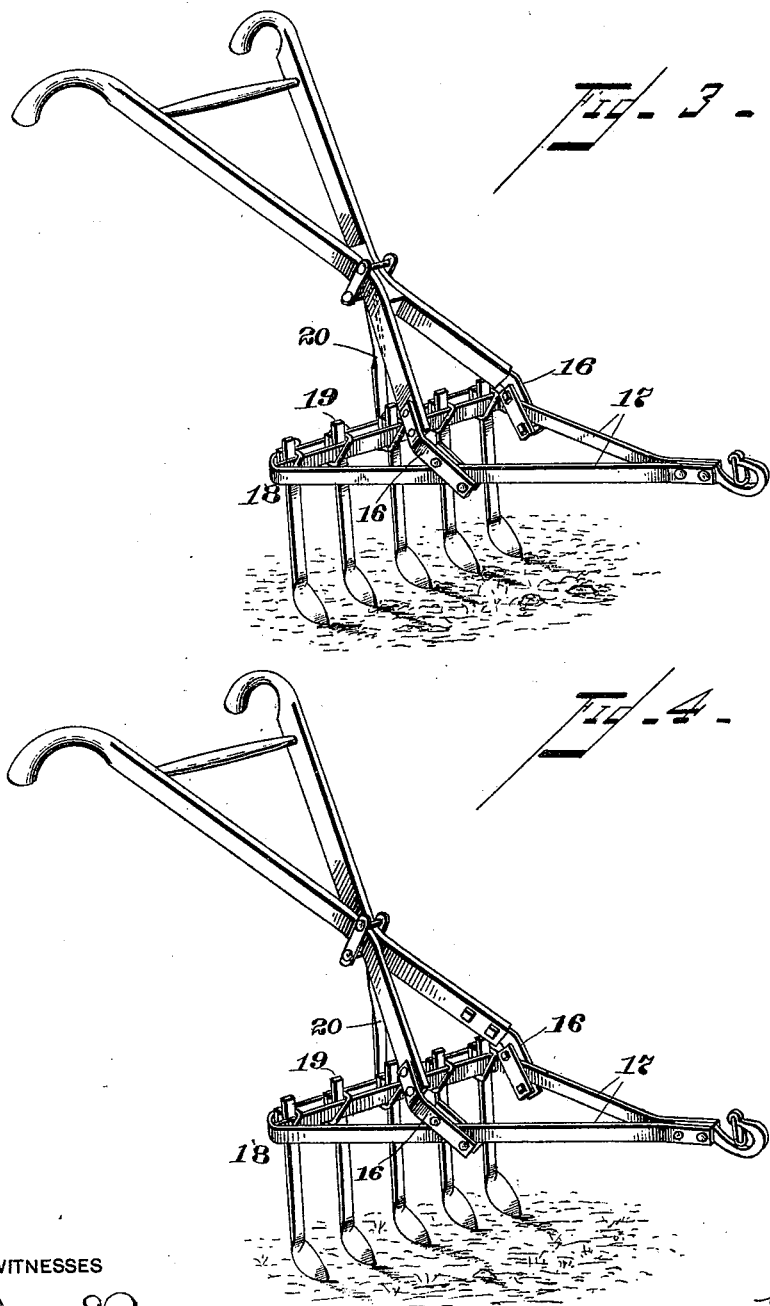

UNITED STATES PATENT OFFICE.

GEORGE C. AVERY, OF LOUISVILLE, KENTUCKY, ASSIGNOR TO B. F. AVERY & SONS, OF SAME PLACE.

CULTIVATOR AND HANDLE THEREFOR.

SPECIFICATION forming part of Letters Patent No. 636,743, dated November 14, 1899.

Application filed September 16, 1899. Serial No. 730,705. (No model.)

*To all whom it may concern:*

Be it known that I, GEORGE C. AVERY, a citizen of the United States, residing at Louisville, in the county of Jefferson and State of Kentucky, have invented certain new and useful Improvements in Cultivators and Handles Therefor; and I do hereby declare the following to be a full, clear, and exact description of the invention, such as will enable others skilled in the art to which it appertains to make and use the same.

My invention relates to improvements in cultivating implements and handles therefor, but more particularly to plows; and it consists in a cultivating implement provided with a suitable beam and frame, a handle formed of pieces bent together so that their outer ends spread apart, the lower ends of said pieces being secured to the framing of the cultivating implement, and a brace-rod secured to the said pieces where they come together and connecting the same with the beam of the cultivating implement.

It also consists in a handle for cultivating implements, comprising pieces or bars bent so as to be drawn together at one point, a clamp for holding them together, and a brace for connecting the handles where they are drawn together with the beam of the cultivating implement, whereby the handle may be strongly braced with respect to the implement.

It also consists in certain other novel constructions, combinations, and arrangements of parts, as will be hereinafter fully described and claimed.

In the accompanying drawings, Figure 1 represents a perspective view of a plow constructed in accordance with my invention. Fig. 2 represents a perspective view of the reverse side of the plow and showing a strengthening-block applied between the handles. Fig. 3 represents a perspective view of a side harrow, the handles applied to the said harrow being formed in accordance with my invention; and Fig. 4 represents a similar view of the side harrow, but without using a spacing-block between the handles. Fig. 5 is a perspective view of a spacing-block used between the bars composing the handle.

My invention is designed to supply plows, harrows, or other similar cultivators which shall be exceedingly simple in construction and which may be provided with a durable handle well braced with respect to the implement.

While I may employ my invention with respect to different kinds of cultivators, yet for the sake of illustration I have shown the same in the drawings as applied to plows and side harrows.

In carrying out the features of my invention I construct a plow, as 1, for example, provided with the usual moldboard 2, share 3, and landside 4, and mount the said parts upon a beam 5, the lower end of which extends downwardly between the moldboard and landside. The handle of the plow is formed of two bars or pieces 6 6, which are drawn together at a point approximately halfway of their length, the said handles spreading to a considerable width at their outer ends, where they are provided with the usual handholds, as 7 7. These outer ends are preferably spaced apart by one or more rods, as 8, so as to thoroughly brace them. The meeting portions of the handles, as at 9, are preferably secured together either by bolts or by a suitable clamp, as 10. I prefer to employ a clamp because it does not have to pass through the material, as is the case with a bolt, and therefore does not weaken the same. As shown in Fig. 1, the handles may be brought directly against each other, but sometimes it is preferable to employ a spacing-block, as 11, (shown in Fig. 2 of the drawings,) the said spacing-block being cut out in such a shape as to fit snugly between the rounded meeting portions of the handles. The lower ends of the handles spread apart, as shown in the drawings, and one is connected to the frame of the plow, while the other is connected with the moldboard 2. A simple means of connecting the handles to the frame and the moldboard is by the use of metallic straps, as 12 13, which are bolted to the plow and extend toward the handles, to which they are also bolted. The narrow part of the handle is also strongly braced with respect to the beam 5 by means of brace-rod 14, which is connected to the clamp 10 at one end, preferably by means of one of its bolts, and to the said beam at the other end by means of a bolt or rivet, as 15. It will be seen that a strong tripod is thus formed by the lower spreading ends of the handle and the brace-rod 14, so that the handle is rigidly and firmly secured to the plow and is also so braced with respect to the same that up-and-down strains and lateral strains upon the said handle are not likely to be able to break the same.

It will be readily seen that a handle of this kind can be easily adapted to plows of all descriptions, as well as other kinds of cultivators. As shown in Figs. 3 and 4 of the drawings, the said handle is applied to a side harrow, the lower spreading ends thereof being secured by means of straps 16 16 to the sides 17 17 of the side harrow 18. In this instance the beam 19 of the harrow is so located that the brace-rod 20 is arranged beneath the handle instead of above it, as shown in Figs. 1 and 2. As illustrated in Fig. 3, the spacing-block may be employed between these handles, as above described, or, as seen in Fig. 4, it may be omitted. It will be seen that in applying the handle to this style of cultivator the strong tripod construction is preserved.

The bars or handles may be made of wood or of metal, or a combination of both, as may be found desirable, and in either case will be attached in the same manner and form a strong connection with the plow or other cultivator.

From the above description it will be apparent that I am enabled to construct plows or other cultivators in an exceedingly simple manner and that I can supply the same with durable and well-braced handles, and, further, that handles of this character can be readily adapted to the different styles of cultivators in common use.

Having now described my invention, what I claim as new, and desire to secure by Letters Patent, is—

1. A cultivating implement comprising a suitable frame, a handle secured thereto formed of side pieces drawn together about centrally of their length, the lower ends of said handles being spread apart and attached to the frame of the implement, a brace-rod connecting the contracted portion of the handle with the beam of the plow and forming with the lower spreading ends of the handle, a strong tripod attachment for rigidly securing the handle to the implement, substantially as described.

2. A handle for cultivating implements comprising pieces or bars bent so as to be drawn together about centrally of their length and spreading apart at each end, a spacing-block interposed between their bent portions, a clamp for holding the bars together against the said spacing-block, means for securing the lower spread ends of the handle to the parts of the plow, and a brace-rod extending from the clamp to the beam for thoroughly bracing the handle with respect thereto, substantially as described.

3. A handle for cultivating implements comprising bars or pieces bent about centrally of their length so as to be drawn together, their outer ends being spread apart, hand-holds secured to the outer ends of the said pieces, spacing rungs or rods for holding them the proper distance from each other, straps applied to the lower spreading ends of the said handle and connecting them with the plow, a brace-rod secured to the narrow portion of the handle at one end and extending to the beam of the plow, to which it is rigidly secured, forming the third leg of a tripod connection between the handle and the said plow, substantially as described.

4. A handle for cultivating implements comprising bars or pieces bent near their central portions, a clamp for drawing the said bent portions together, straps for connecting the lower spreading ends of the said handle to the frame of the implement, and a strap extending from the clamp to another portion of the implement for forming a rigid connection between the said handle and the said implement, substantially as described.

In testimony whereof I hereunto affix my signature in presence of two witnesses.

GEORGE C. AVERY.

Witnesses:
C. M. BROUGH,
WM. BLACK.